Oct. 19, 1965     W. F. WILLBOND     3,212,693
SHOE MACHINERY
Filed May 6, 1963     11 Sheets-Sheet 1

*Inventor*
William F. Willbond
By his Attorney

Oct. 19, 1965 W. F. WILLBOND 3,212,693
SHOE MACHINERY
Filed May 6, 1963 11 Sheets-Sheet 3

Oct. 19, 1965  W. F. WILLBOND  3,212,693
SHOE MACHINERY
Filed May 6, 1963  11 Sheets-Sheet 4
Fig. 4
Fig. 5
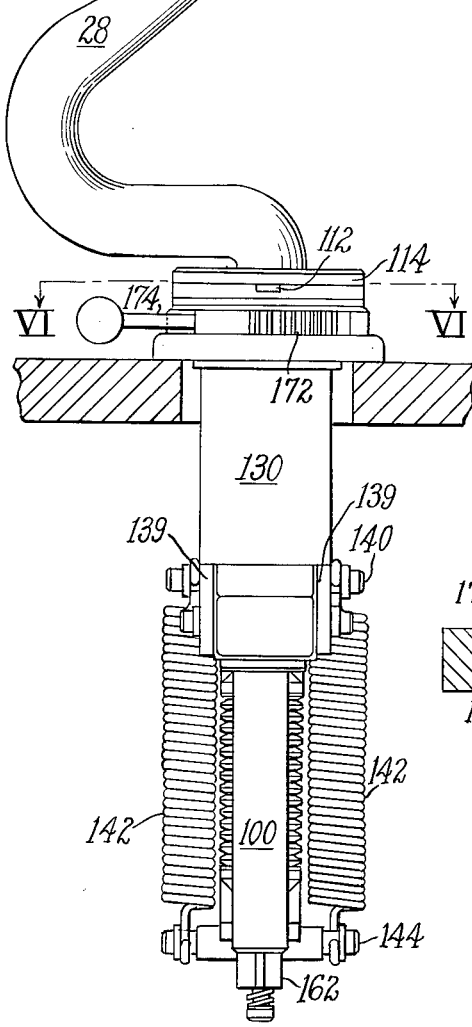
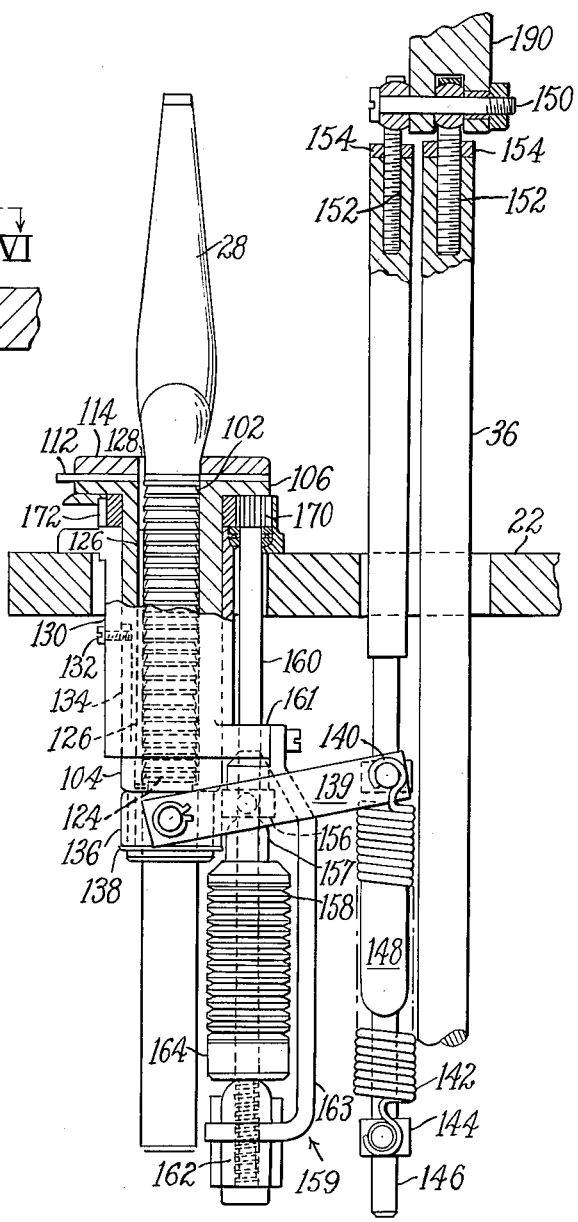

Oct. 19, 1965   W. F. WILLBOND   3,212,693
SHOE MACHINERY
Filed May 6, 1963   11 Sheets-Sheet 5

Oct. 19, 1965    W. F. WILLBOND    3,212,693
SHOE MACHINERY

Filed May 6, 1963    11 Sheets-Sheet 6

Oct. 19, 1965   W. F. WILLBOND   3,212,693
SHOE MACHINERY

Filed May 6, 1963   11 Sheets-Sheet 8

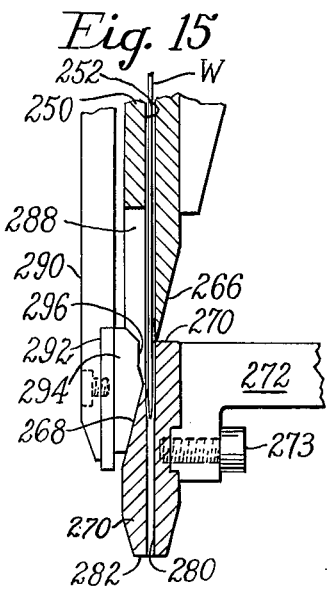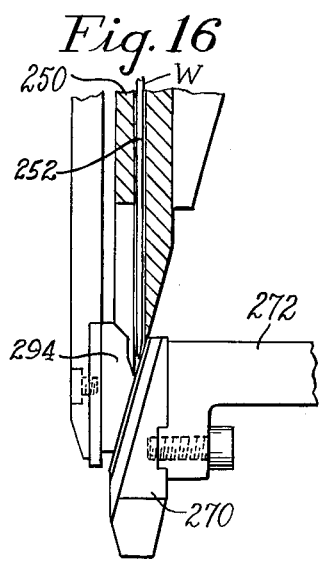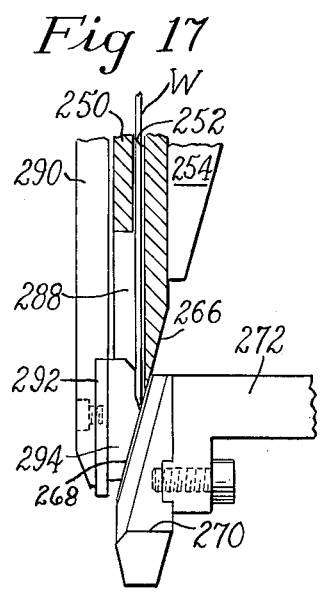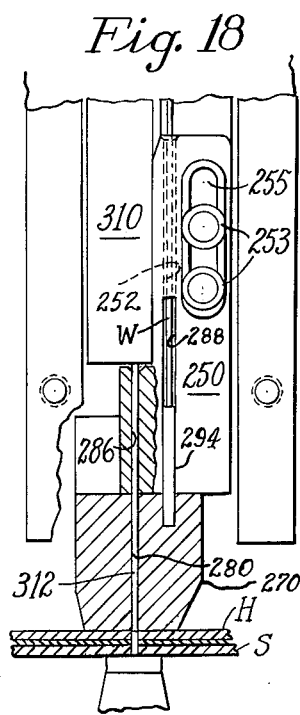

Oct. 19, 1965 W. F. WILLBOND 3,212,693
SHOE MACHINERY
Filed May 6, 1963 11 Sheets-Sheet 10
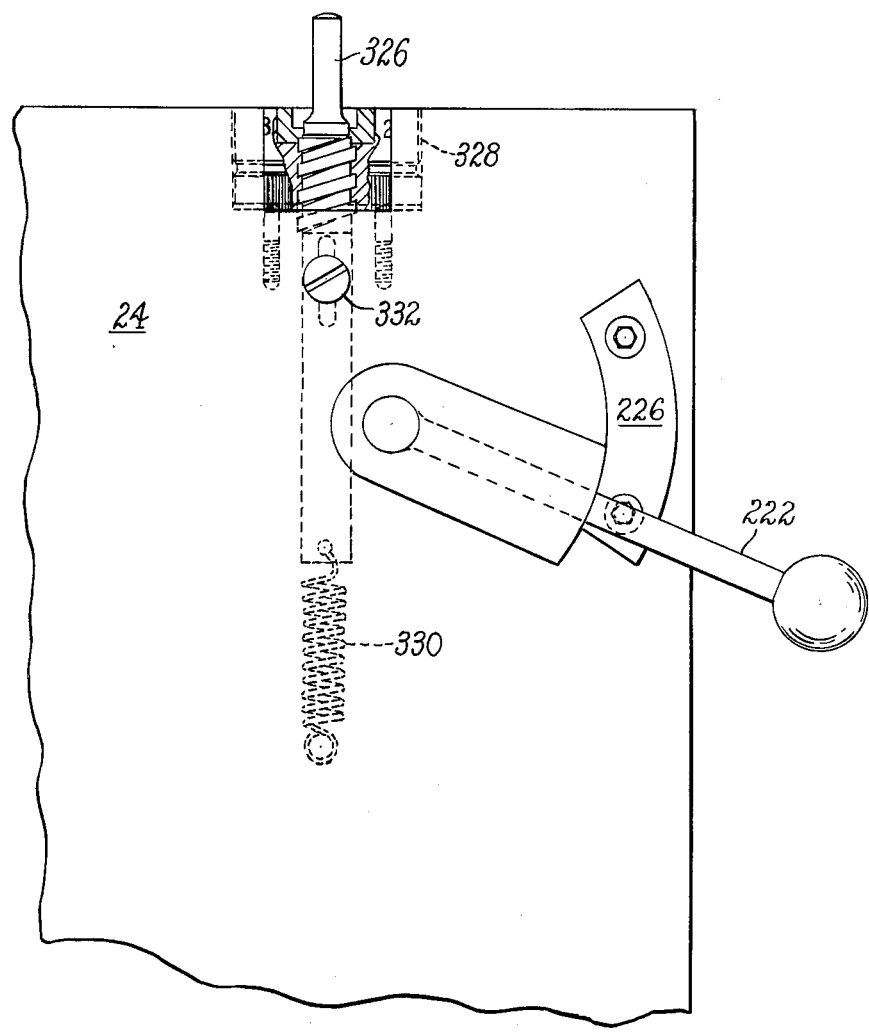

United States Patent Office 3,212,693
Patented Oct. 19, 1965

3,212,693
SHOE MACHINERY
William F. Willbond, Leicester, England, assignor to United Shoe Machinery Corporation, Flemington, N.J., a corporation of New Jersey
Filed May 6, 1963, Ser. No. 278,057
Claims priority, application Great Britain, May 24, 1962, 19,947/62
6 Claims. (Cl. 227—84)

This invention relates in general to machines for repairing shoes, and more particularly to heel-lift and half-sole attaching machines.

The invention will be described in connection with a shoe repair machine but it will be understood that the principle of the invention may be applied to wire fastener machines of all types. Fastener forming and inserting machines of the type to which this invention applies have, in the past, failed to attain consistently straight driving of the fasteners, and a relatively sharp point is needed on the fasteners for ready penetration of the material by the fasteners. Such a point is most easily attained by cutting obliquely the continuous length of wire from which the fasteners are formed. The point formed in this manner is necessarily offset from the longitudinal axis of the fastener formed and has a tendency upon driving to deflect in the direction of this offset so that crooked driving results, especially when relatively hard materials must be penetrated. One object of this invention is to provide mechanism for cutting fasteners from wire fed from a reel in such manner that a point is formed on the wire stock on the central axis thereof. Another object is to provide a machine wherein the length of wire feed and the depth of drive are adjustable. Another object is to provide means for cutting fasteners from the wire and rapidly but reliably inserting them in a workpiece, such as a shoe.

Another object of the present invention is to provide an improved machine which, on actuation of means under the control of the operator, causes a fastener to be driven into a workpiece, the fastener having been cut in a cycle of operation of the machine, from wire drawn from a reel. The word "fastener" is used herein to denote an element intended to be inserted into a work piece, whether for the purpose of joining parts of the work piece together or otherwise.

In the achievement of these objects, and in accordance with a feature of this invention, there is provided a a fastener-inserting machine adapted for use in the shoe repair industry, for example, for the attachment of top pieces to heels or of half soles to shoe bottoms, comprising means for supporting a reel of wire, means for feeding wire stock from the reel step by step by an adjustable amount that determines the length of fastener to be driven into the work, means for shearing the wire obliquely of its axis to separate a fastener from the stock, and means for driving the thus severed fastener into the work, the machine also comprising means operable upon the end of the wire stock before separation of a fastener therefrom, to cause the point left at one side of the wire by the previous oblique shearing operation to be turned onto, or substantially onto, the axis of the wire. The shearing means of the illustrative machine comprises a shear block rotatable, for the shearing operation, about an axis substantially parallel to the axis of a bore therein which alines with a bore in a jaw through which the wire is fed, the wire after being fed into the bore in the shear block being sheared against the jaw. Co-operative faces of the jaw and shear block are inclined at an angle of 15° to the axis of the bores so that an oblique shear is obtained leaving a point at one side of the wire. The jaw is slidable along the inclined face of the shear block, in the plane of the wire, and is slotted at one side to admit its riding over a stationary abutment. In the operation of the machine, the jaw is caused to slide in such manner that the point of the wire stock, before being fed into the bore in the shear block, is forced against the abutment and thus caused to assume its position on, or substantially on, the axis of the wire.

Pivotal movement of the shear block brings the bore therethrough, and thus the separated fastener therein, into line with a second bore in the jaw and with a driving pin therein by which the fastener is driven into the work. Actuation of the wire-feeding means, the jaw, the shear block, and the driving pin is caused to take place in sequence by a vertically reciprocable cam bar actuated by a cam-controlled pawl engageable with ratchet teeth formed at a hub portion of a pulley driven by a belt from an electric motor. The driving pin is mounted on a driver bar carried by the cam bar with provision for advancement relative thereto against the action of a spring, and there is a stop pin arranged to be engaged towards the end of a downward stroke of the driver bar by a lever connected to the driver bar. Adjustment of the heightwise position of the stop pin enables the depth of penetration of the work by the driving pin to be varied.

The machine inclues a work support, such as a horn, which is found most convenient for shoe repairers; but work supports of other shapes may be provided instead if it is desired to use the machine for other purposes, for example, in the wood working industry. The horn can be raised by the operator to bring the work thereon into contact with an abutment surface constituted by the underside of the shear block. A graduated scale mounted to move up and down with the horn indicates to the operator the number of units of distance that the horn is spaced from the abutment surface. A graduated scale in the same units is associated with the means for adjusting the length of feed of the wire; so that the length of fastener can readily be determined by selection with reference to the work thickness.

The work support is arranged to be raised by the operator to bring the work into contact with the shear block and then to be pressed upwardly by a lever pivotally supported by a bearing of an adjustable compression spring assembly and acted upon, to rock it about its pivotal support, by a tension spring. The arrangement is such that the compression spring assembly yields when the upward thrust on the work support reaches a maximum determined by adjustment of the assembly and thereafter compensates for further extension of the tension spring. The maximum upward pressure exerted by the work support is thus substantially uniform irrespective of the precise thickness of the work and the precise position of the work support after it has been raised by the operator.

The illustrative machine enables fasteners to be cut from wire and rapidly and reliably inserted in work pieces without loss of control of the direction of drive of the fasteners. As each fastener is driven, the end in contact with the driving pin is bent over to form a head which may be sunk an adjustable distance below the surface of the work. Means whereby the jaw and shear block are mounted in the illustrative machine enables them to be readily replaced with their bores in alinement after being removed for regrinding of their co-operative surfaces.

A modification of the illustrative machine in which the jaw against which the wire is sheared remains stationary in the operation of the machine and provides also an abutment against which a blade slidable along the inclined face of the shear block and into a slot in the jaw causes the point of the wire stock to assume its position on, or substantially on, the axis of the wire, is also described in detail hereinafter.

Other objects and features of this invention and a fuller understanding thereof may be had by referring to the following description and claims taken in conjunction with the accompanying drawings, in which:

FIGS. 4 and 5 are views, partly in section, from the front and right-hand side respectively of a work support of the machine;

FIGS. 15, 16, 17 and 18 are fragmentary views largely in section and on an enlarged scale of the shear block and a jaw of the machine showing them in different relative positions that they occupy in succession in an operating cycle of the machine;

FIG. 19 is a fragmentary view partly in section of means for adjusting a stop screw of the illustrative machine that determines the depth of penetration into the work of a driving pin of the machine;

Figure 1:
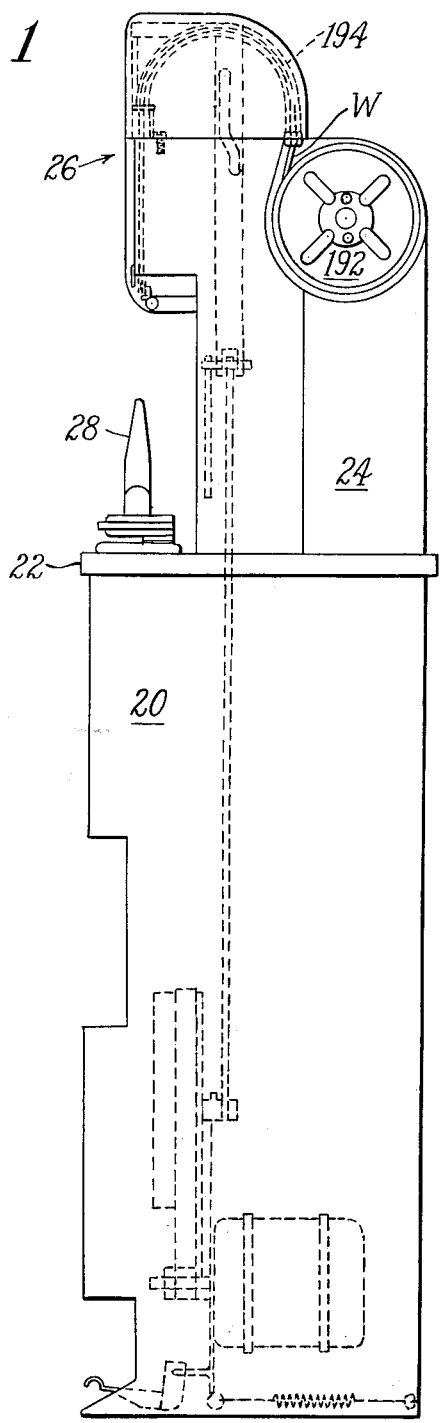
FIG. 1 is a view in right-hand side elevation of the illustrative machine.
Figure 8:
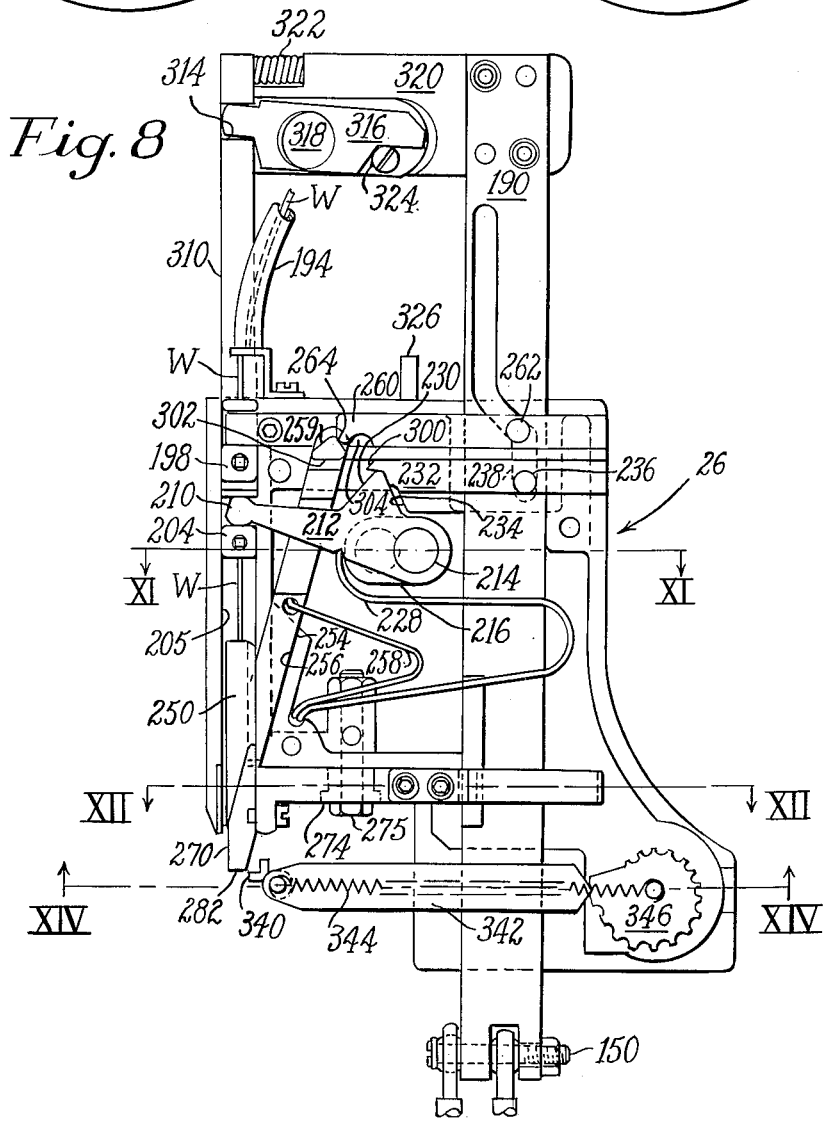
FIG. 8 is a view in right-hand side elevation, partly in section and with a cover plate removed, of a head of the machine.
Figure 9:
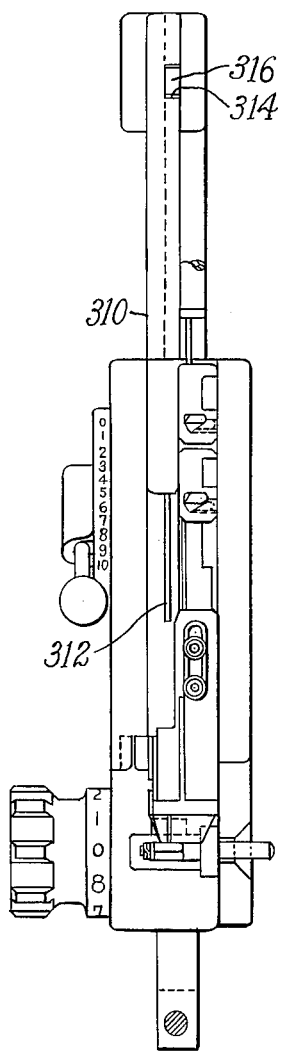
FIG. 9 is a front view of the head of the machine.

The illustrative machine comprises a lower housing 20 (FIGS. 1, 2 and 3) which stands on the floor, a table 22, and an upper housing 24 (FIG. 1) which encloses an operating head 26 of the machine shown generally in FIG. 8. The head 26 overhangs a front part of the table 22 where a work supporting horn 28 is located.

Figure 2:
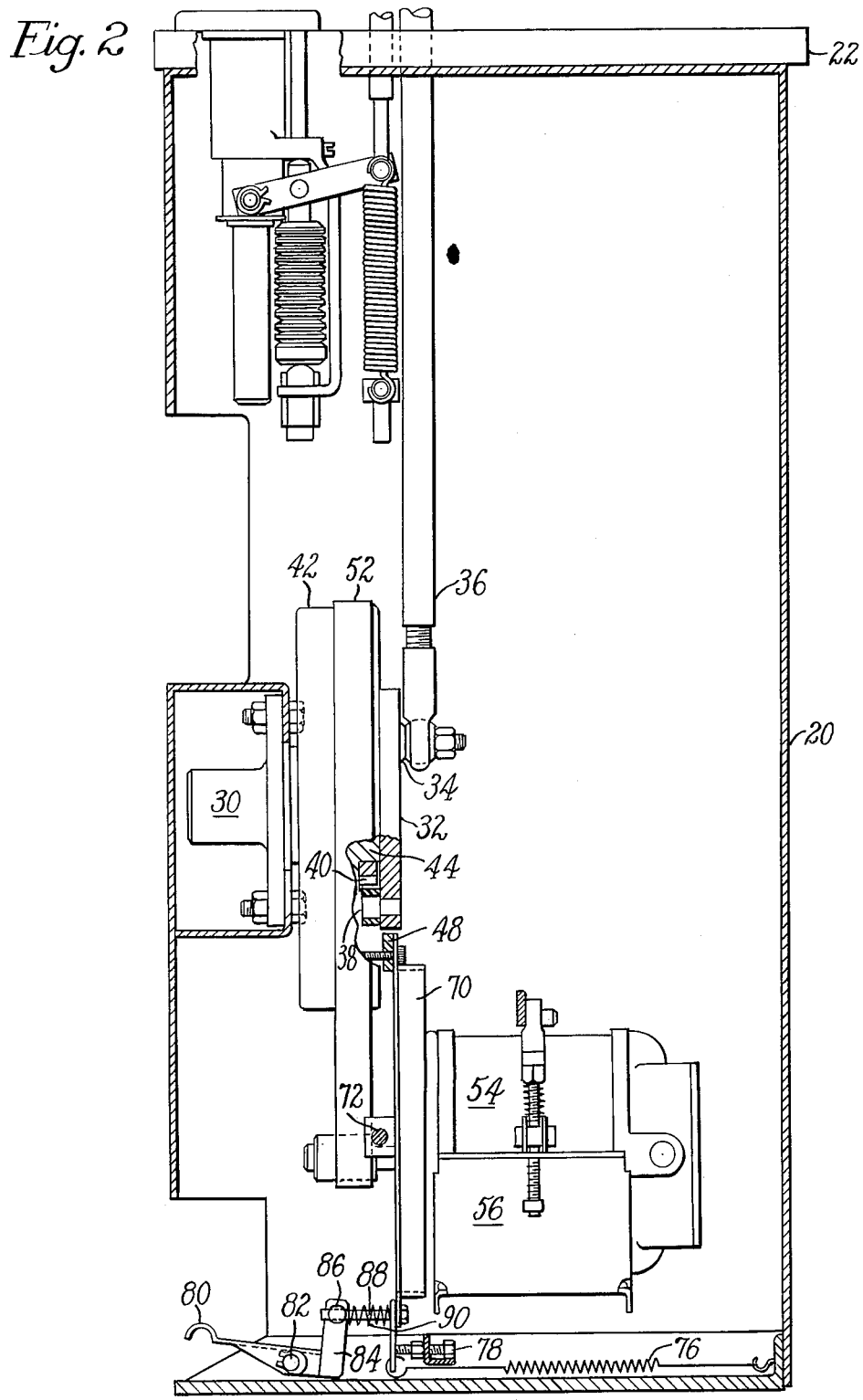
FIG. 2 is a view in right-hand side elevation, with a cover plate removed, and partly in section, of a lower part of the machine.
Figure 3:
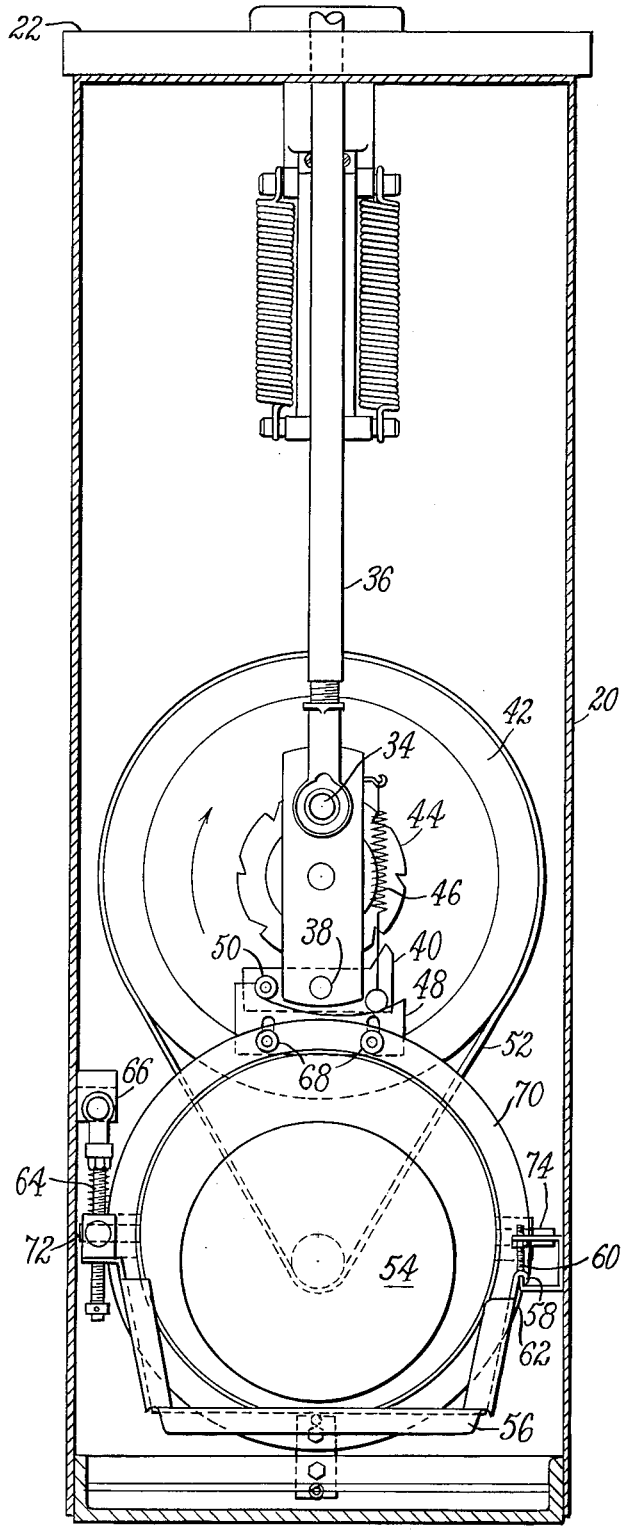
FIG. 3 is a view from the rear of parts visible in FIG. 2.

Referring to FIGS. 2 and 3, inside the lower housing 20 of the machine is a bearing 30 for a shaft carrying a crank 32 to which is pivoted at 34 an upwardly extending drive rod 36. The crank 32 also carries a pivot pin 38 which supports a pawl 40. Freely rotatable concentrically on the crank shaft is a pulley 42 with a hub portion 44 formed with ratchet teeth arranged for engagement by the pawl 40. A tension spring 46 urges the pawl 40 towards engagement with the teeth of the portion 44, but the pawl, when the machine is at rest, is held out of such engagement by a cam 48 against which a roller 50 on the pawl 40 rests.

The pulley 42 is driven continuously when the machine is in operation by a belt 52 from an electric motor 54 mounted upon a sheet metal bracket 56. A lip 58 on the bracket 56 is held by a stop screw 60 on a ledge 62 on the inside of the lower housing 20. The lip 58 and ledge 62 serves as a hinge for the bracket 56, so that the tension of the belt 52 can be adjusted by a screw-threaded rod 64 anchored to a lug 66 on the lower housing 20.

The cam 48 is adjustably secured by bolts 68 passing through slots in the cam to an annulus 70 pivoted to the housing 20 at 72, 74 for swinging about a horizontal axis. The annulus 70 is urged anticlockwise, as viewed in FIG. 2, by a tension spring 76 to the limit allowed by an adjustable stop screw 78 mounted on a lug on the housing 20; when in engagement with the screw 78, the cam 48 lies in engagement with or in the path of movement of the roller 50 on the pawl 40. A pedal 80 pivoted to the housing 20 at 82 has an upstanding yoked arm 84 which supports a pin 86 with a tapped hole through which passes a bolt 88. The bolt 88 also passes through a hole in the rim of the annulus 70 and carries a spring 90 between the arm 84 and annulus 70 to urge them apart. Thus depression of the pedal will swing the annulus clockwise, as viewed in FIG. 2, and move the cam 48 rearwardly out of engagement with the roller 50. This releases the pawl 40 for engagement with one of the teeth on the hub portion 44 of the pulley 42, so that the crank 32 is driven to move the rod 36 down and up. Upon release of the pedal, the annulus swings back to interpose the cam 48 in the path of the roller 50. When the roller engages the cam, the pawl swings on the pivot 38 to disengage the portion 44, and the machine thereupon comes to rest with the rod 36 at the top of its stroke, as shown in FIGS. 2 and 3 with roller 50 in engagement with cam 48.

Figure 6:
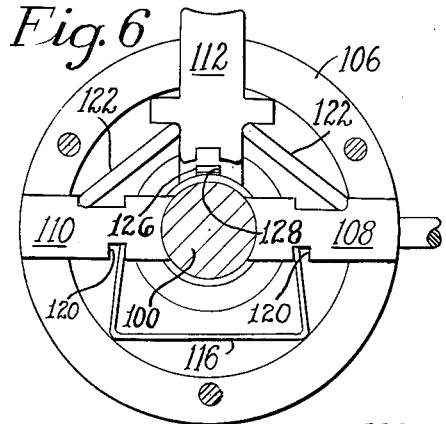
FIGS. 6 and 7 are views in section of the line VI—VI of FIG. 4 showing the disposition of parts of the work support with a handle thereof in each of two positions.
Figure 7:
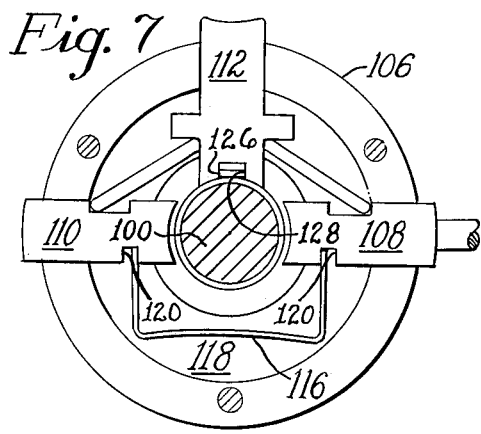

When operating on shoes, the horn 28 (FIGS. 4 and 5) may be employed as a work support, but it will be understood that other shapes of support can be used for other kinds of work. The support is mounted upon a vertical shaft 100, a substantial part of which comprises a rack 102 having circular ratchet teeth. The shaft 100 is freely mounted in a sleeve 104 both for up and down and rotational movement; when unrestrained it falls under gravity to the position shown in FIGS. 4 and 5. The sleeve 104 has a flange 106 at its upper end which is grooved radially to accommodate two slidable, diametrically opposed, pawls 108, 110 and a button 112 (FIGS. 6 and 7). A cover plate 114 is bolted on top of the flange 106 and has a hole through it large enough to accommodate the shaft 100 but small enough to serve as a stop for the horn in its lowermost position. The pawls 108, 110 are urged towards each other by a U-shaped leaf spring 116 (FIGS. 6 and 7) accommodated within a circular recess 118 in the flange 106 and with its ends received in notches 120 in the pawls. Two links 122 are also accommodated in the recess 118, one abutting against a shoulder on the pawl 108 and the button 112 and the other against a shoulder on the pawl 110 and the button 112. The arrangement is such that under the influence of the spring 116, the pawls are urged towards each other and into such locking engagement with the rack 102 that while inclined faces of the rack and pawls will allow the horn to be raised (the pawls and spring yielding) the pawls will prevent downward movement of the horn relative to the sleeve 104. Release of the pawls to permit such downward movement of the horn from a raised position can, however, be effected by the operator upon pressing the button 112 to cause the pawls to be thrust apart by the links 122 and the rack to drop between them.

The shaft 100 is provided with a peripheral groove 124 which accommodates a lug on a rear face of an elongated bar 126 which is free to slide up and down, in front of the rod 100, in a vertical guideway 128 on the inside of the sleeve 104 and continued through the cover plate 114. The bar 126 is exposed above the cover plate when the horn is raised preparatory to operating the machine, and carries markings which will be referred to below.

The sleeve 104 is mounted for vertical movement in a bearing 130 bolted to the table 22 and is prevented from rotating by a screw 132 projecting into a vertical slot 134 in the sleeve. A reduced lower end portion of the sleeve carries a trunnion block 136 held in place by a clip 138. Two links 139 pivoted to the block 136, one at each side, project rearwardly and are pivoted at their rearward ends to a cross bar 140. The links constitute a rocking lever. Two tension springs 142 depending from the cross bar support a second cross bar 144. A vertical rod 146 passes slidably through holes in the cross bars 140, 144 and has secured to it, between the bars, an elongated collar 148. The rod 146 is pivoted at its upper end on a horizontal pin 150 lying parallel to the axis of the shaft carrying the crank 32. The pin 150 also pivotally supports the upper end portion of the rod 36. The arrangement is such that downward movement of the rod 36 results in downward movement of the rod 146 first to slide freely through the cross bars 140, 144 and then, by engagement of the collar 148 with the bar 144, to exert downward pressure through the springs 142 on the cross bar 140. The effective lengths of the rods 36 and 146 are variable by virtue of screws 152 held by lock nuts 154 (FIG. 5) at their upper ends permitting adjustment of the initial lost motion of the rod 146 through the bar 144.

At an intermediate position between the trunnion block 136 and the cross bar 140, the links 139 are pivoted to a sleeve bearing 156, which forms part of a compression spring assembly 159 and lies on an end piece 157 resting on a number of superposed Belleville washers 158. A vertical rod 160 extends through a lug 161 projecting from the bearing 130, and is threaded below the washers 158 into a nut 162 held against rotation by a bracket 163 depending from the lug 161 of the bearing 130. An end piece 164 below the washers 158 rests on the nut 162; the assembly 159 can thus be compressed to a variable degree between the nut 162 and the lug 161 by heightwise adjustment of the nut. The nut 162 can be adjusted heightwise by rotating the rod 160, which has at its upper end a pinion 170 in meshing engagement with a pinion 172 freely rotatable about the sleeve 104; the pinion 172 has projecting from it an arm 174 which passes through an opening in the bearing 130 and is thereby accessible to the operator. When the illustrative machine is at rest, the spring assembly 159 is not under significant compression and is arranged not to yield significantly until the tension in the springs 142 consequent on downward movement of the rod 146 is sufficient to impart to the horn, through the links 139 and the trunnion block 136, an upward thrust sufficient to hold the work firmly during a fastener-inserting operation; further depression of the rod 146 after this condition has been reached will only maintain such upthrust without substantially increasing it, as further extension of the springs 142 will be offset by the yielding of the spring assembly 159. The work is thus subjected to a maximum pressure determined by the setting of the arm 174.

Figure 10:
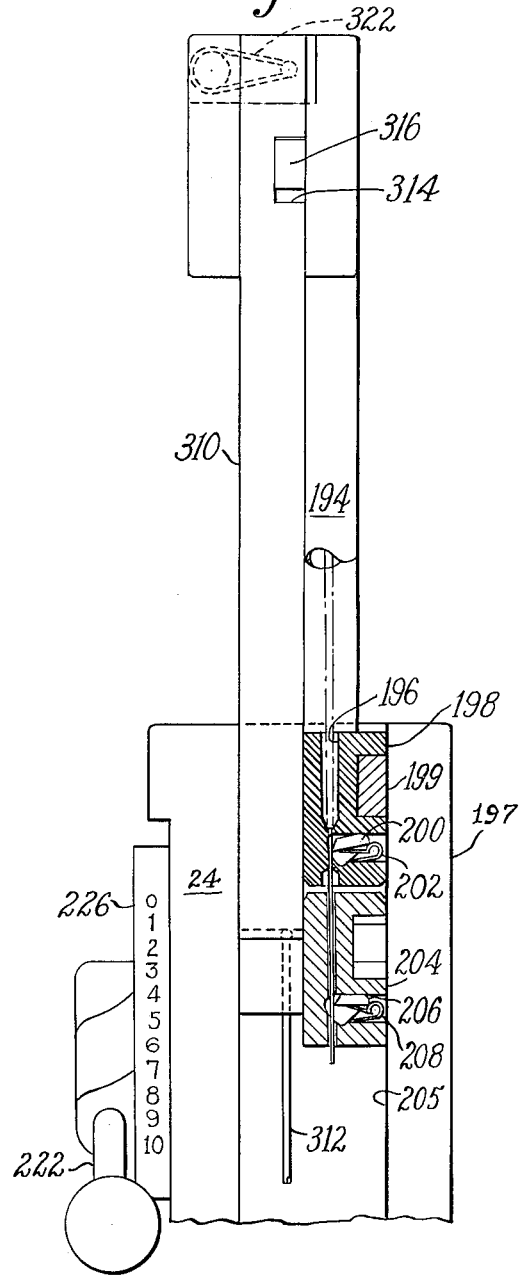
FIG. 10 is a front view, partly in section, showing wire-feeding means of the machine.
Figure 11:
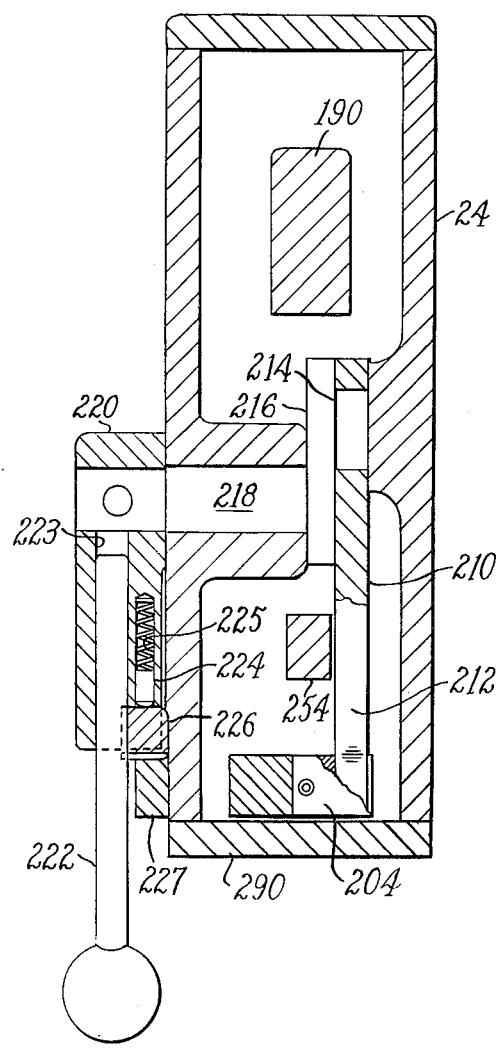
FIG. 11 is a view in section on the line XI—XI of FIG. 8 showing means for adjusting the length of feed of the wire-feeding means of the machine.

The operating head 26 of the illustrative machine comprises a reciprocating cam bar 190 (FIG. 8) coupled at its lower end to the pin 150 so as to move down and up in response to each revolution of the crank 32. The upper housing 24 (FIG. 1) provides a support for a reel 192 of wire W; wire stock from the reel is fed through an arcuate tube 194 (see also FIG. 10) and down through a passage 196 in a stationary block 198 held in place by a pin 199 projecting from a plate 197 bolted to the upper housing. A pawl 200 pivotally mounted in a recess in the block and urged upwardly by a leaf spring 202 permits downward passage of the wire W but restrains upward passage. Below the block 198, a feed block 204 is mounted for up and down sliding movement in a vertical guideway 205 in the housing 24; the block 204 has a similar pawl 206 and spring 208, the pawl operating on the wire to grip and feed it when the block moves downwardly, but permitting the block to slide upwardly along the wire when the block is raised. The block 204 is recessed to receive a curved-ended portion 210 of a lever 212 pivoted at 214 on an arm 216 (FIGS. 8 and 11). The arm 216 is secured to a shaft 218 which passes through a bearing provided by the housing 24; outside the housing the shaft 218 has fixed to it an arm 220. A handle 222 is slidable along a bore 223 in the arm, and by turning the shaft by means of the handle, the heightwise position of the pivot 214 can be adjusted. A spring-pressed plunger 224 projects from a bore 225 in the arm 220, and a tapered edge of a lug 226 secured to the handle is arranged to engage a toothed rear face of an arcuate plate 227 secured to the housing; the lug 226 by engagement with the plate 227 keeps the handle in the bore 223 and restrains the handle from moving from its adjusted position. The smooth front face of the plate is marked with graduations (referred to again hereinafter).

The lever 210 is urged upwardly about the pivot 214 by a U-shaped bent spring 228 bearing in a notch in the housing 24 and in a notch on the underside of the lever. A lug 230 projects upwardly from the lever into the horizontal path of movement of a slide 232 having an inclined front face 234. The slide 232 has a projecting pin 236 accommodated in a cam slot 238 in the cam bar 190. End portions of the slot are vertical; an intermediate portion is inclined. On a downward stroke of the bar 190, the inclined portion of the slot causes the slide 232 to move forward and, by engagement with the lug 230, to rock the lever 212 anticlockwise (as viewed in FIG. 8), thus moving the block 204 downwardly and, with it the wire stock W. The slide 232 moves back when the bar 190 moves up, allowing the spring 228 to lift the block 204 so that the pawl 206 can grip a fresh piece of wire. The length of stroke imparted to the block 204 (and thus the length of each feed stop of the wire) is determined by the height up the inclined front face 234 of the slide of the point of engagement of the slide with the lug 230. This height is adjustable by raising and lowering the pivoted end portion of the lever by the handle 222.

Below the block 204 in the upper housing 24 of the illustrative machine is a jaw 250 having a vertical bore 252 in it for the wire W (see FIGS. 8, 15, and 16) to pass through. The jaw 250 is attached by screws 253 (see FIG. 18) passing through a vertical slot 255 in the jaw to a vertical front face of an inclined arm 254 slidably mounted in an inclined channel 256 in the housing 24. The jaw is accommodated in the guideway 205 with provision for a small amount of movement along the direction of the channel 256. The arm 254 is urged upwardly along the channel 256 by a V-shaped spring 258 acting between a notch in the arm and a notch in the housing. The upper end of the arm 254 has a rounded shoulder 259 and rests against a slide 260 mounted so as to be moved to and fro by the cam bar 190 into the slot 238 of which projects a pin 262 on the slide. A cam rise 264 on the slide, by engagement with the shoulder 259, causes the arm 254 to be depressed a short distance each time the shoulder passes over, twice in each cycle of operation of the machine, once when the bar 190 moves up and the slide 260 moves forward and once when the bar moves down and the slide moves back. The arm returns to its up position after each depression due to the action of the spring 258.

Figure 12:
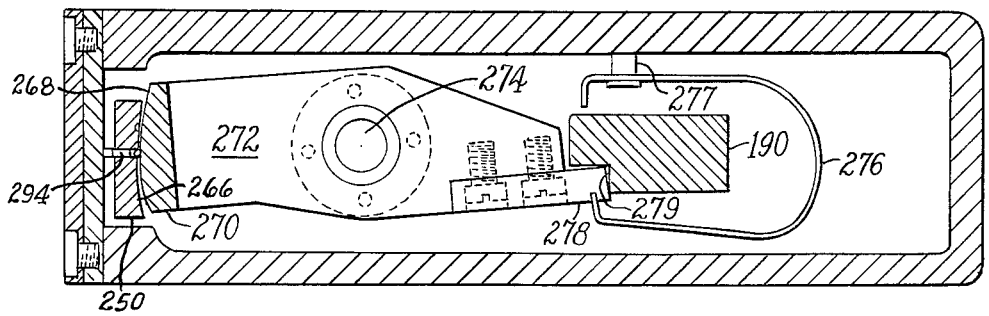
FIG. 12 is a view in section on the line XII—XII of FIG. 8 showing a shear block of the machine in a position it occupies when the machine is at rest.
Figure 13:
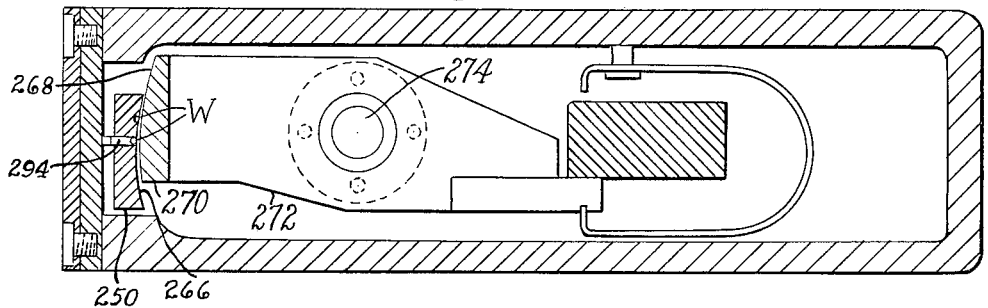
FIG. 13 is a view similar to FIG. 12 but showing the shear block in a position it occupies after severing a fastener from wire stock in the operation of the machine and while the fastener is being driven into the work.

The jaw 250 of the machine has a shearing face 266 into which the bore 252 opens; the face 266 is in contact with a co-operating shearing face 268 of a shear block 270. A flat vertical rear face of the block 270 lies against a vertical front face of a lever 272 to which the block is removably secured by screws 273; a channel in the block accommodates a tenon on the face of the lever. The lever 272 is mounted for rocking movement on an eccentric bush 274 secured to a flat undersurface of the housing by a vertical screw 275 (see FIGS. 8, 12, and 13). By loosening the screw and turning the bush, the critical position of the rocking axis lever can be finally adjusted. The faces 266, 268 are inclined to the vertical at an angle of 15°, which is also the angle of inclination of the channel 256; these faces are part conical about the rocking axis of the lever. The lever 272 is urged anticlockwise, viewed from above, by a U-shaped spring 276 which is anchored to the housing at 277 and engages a notch in the lever. The spring urges a hardened lip 278 secured to the lever into engagement with the right-hand side of the cam bar 190. The bar 190 is recessed at 279 and so arranged that when the bar is raised in the operation of the machine it causes the lever to swing clockwise through a small angle from the position shown in FIG. 12 to that shown in FIG. 13. A vertical bore 280 through the shear block opens into the shearing face 268 and out through a flat abutment surface 282 on the underside of the block. Wire fed through the bore 252 of the jaw 250 and into the bore 280 of the shear block 270 (see FIG. 15) is thus sheared obliquely at an angle of 15° to its axis when the shear block is rocked clockwise in a cycle of operation of the machine. Such shearing leaves a 15° point at the front side of the wire stock in the bore 252 of the jaw (see FIG. 16).

Rocking of the shear block 270 to its clockwise position in the operation of the machine brings the bore 280 into alinement with a vertical bore 286 in the jaw 250 alongside the bore 252 (see FIG. 18). The severed piece of wire is carried across to this position by the shear block; it constitutes a fastener to be driven into the work which is held below the shear block on the horn 28.

A vertical slot 288 in the front of the jaw 250 opens into the bore 252. The front of the housing 24 is formed by a detachable cover plate 290 to the rear side of which is bolted a hardened steel plate 292. An anvil 294 is poised in the slot 288 resting against the cover plate 290 and upon the face 268 of the shear block 270. The anvil 294 has an inclined rear face 296. When, in the operating cycle of the machine, a short downward stroke is imparted to the arm 254 by the cam rise 264, the jaw 250 presses the pointed end of the wire stock against the face 296 of the anvil 294 with the result that the point formed on the front side of the wire stock W is caused to turn substantially onto the axis of the wire (FIG. 17). This action of the jaw takes place twice on each end piece of wire in the operation of the illustrative machine, firstly on the return upstroke of the cam bar 190 towards the end of one operating cycle of the machine after the wire has been sheared and the sheared off fastener driven, and secondly on the downstroke of the cam bar at the beginning of the next operating cycle before the wire stock is fed downwardly.

The slide 232 has a forwardly projecting tongue 300 which is arranged to slide under a shoulder 302 on the arm 254 when the slide 232 approaches its foremost position to ensure that the arm is raised into a recess 304 behind the cam rise 264 during further descent of the cam bar 190. An interlock between the slide 232 and jaw 250 is thus provided ensuring that the jaw is in its raised position for the driving of the fastener even should the spring 258 have broken.

In the guideway 205, alongside the jaw 250 and the blocks 198, 204 of the wire-feeding mechanism of the machine, is a vertically reciprocable driver bar 310 with a driving pin 312 at its lower end. The pin is arranged to pass through the vertical bore 286 in the jaw 250 at the time when the jaw is interlocked with the slide 232 to ensure alinement of the pin and bore and avoidance of damage to the pin should the spring 258 have broken. The pin 312 has a hemispherical recess at its tip which is effective to bend over the pointed top of the fastener which it drives into the work. The driver bar 310 is recessed at its upper end at 314 to accommodate a rounded end portion of a rocking lever 316 pivoted on an eccentric portion of a stud 318 mounted in a forwardly projecting arm 320 bolted to the cam bar 190. The axis of the stud 318 is horizontal but not quite at right angles to the arm 320. A torsion spring 322 acts between the arm 320 and the driver bar 310 to urge the driver bar upwardly relatively to the cam bar 190; a stop pin 324 limits clockwise rocking of the lever (FIG. 8). The driver bar 310 is thus brought down on descent of the cam bar 190 and as the bar 190 reaches the bottom of its stroke, a rear end portion of the lever 316 strikes an adjustable stop screw 326 mounted with its axis vertical in a tapped hole in a rotatable bearing 328 in the housing 24 (see FIG. 19). The bearing 328 is held against axial movement by the housing and has a knurled graduated periphery which projects through an opening in the housing so as to be accessible to the operator. The screw 326 is acted on from below by a tension spring 330 to overcome any play between the screw and bearing and to provide sufficient friction between them to restrain accidental rotation of the bearing. A screw 332 in a tapped hole in the housing projects into a vertical slot in the screw 326 to prevent its rotating. The arrangement is thus such that on rotating the bearing 328 the screw is raised or lowered. The eccentric stud 318 is preferably set in the illustrative machine so that at the end of the downstroke of the cam bar 190 the driving pin 312 will just reach the undersurface 282 of the shear block 270, with the lever 316 still in contact with the pin 324. Adjustment of the screw 326 to an adjustable level at which it will be struck by the lever 316 will then cause the lever to rock on the stud 318 and the driving pin to project beyond the face 270 at the end of its downward stroke. Such projecting causes the driving pin to penetrate into the surface of the work in the operation of the illustrative machine, and the depth of such penetration is adjustable by turning the bearing 328. Means (not shown) may be provided to permit only one revolution of the bearing; the graduations thus represent a measure (viz in ¹⁄₆₄ inch) of the penetration of the driving pin.

Figure 14:
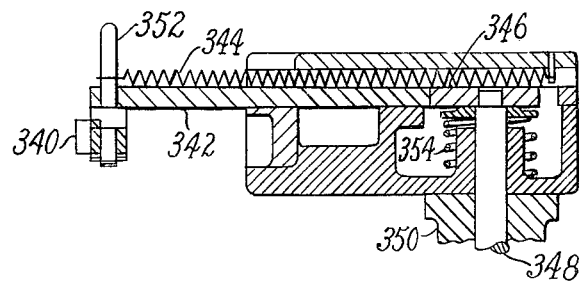
FIG. 14 is a view in section on the line XIV—XIV of FIG. 8 showing an adjustable work gage of the machine.

Referring to FIGS. 8 and 14, a work gage 340 is pivoted on a forwardly and rearwardly extending bar 342 so as to lie adjacent the face 282 of the shear block 270. The gage is shown in FIG. 8 in a raised position with an operative edge close to the surface 282; it is prevented from further clockwise movment by a shoulder on the bar 342. It can be swung downwardly through 90° to an alternative position in which another operative edge lies somewhat farther below the surface 282. The former position is intended for use in repairing soles; the latter in attaching top lifts to heels. The bar 342 is biased rearwardly by a spring 344 into contact with the periphery of a wheel 346 mounted rotatably in the housing 24. The rear end of the bar is rounded and the periphery of the wheel has a series of hemispherical recesses of varying depth. The wheel is secured to a shaft 348 which passes through the housing and carries a knob 350. By turning the wheel by means of the knob 350, which has graduated markings on it, the gage can be set at any desired distance behind the bore 280 in the shear block. The shaft 348 is capable of sufficient axial movement in the housing to allow it to be pulled by the knob out of alinement with the bar 342. On so pulling the knob, the spring 344 pulls the gage to the rear, well clear of the shear block and out of the way if its use is not required. To bring it back into use, the bar is pulled forward by the operator by means of a finger 352 constituted by an extension of the pivot on which the gage 340 is mounted. The wheel is then restored to its position in alinement with the bar by a compression spring 354.

In the operation of the illustrative machine for fastening a half sole on a shoe, the operator places a shoe S and half sole M (FIG. 18) upside down on the horn 28 and lifts the horn so that the sole H contacts the undersurface 282 of the shear block 270. At this time, a marking on the bar 126 will be just visible above the cover plate 114. These graduations may, for example, be at ⅛ inch spacing and indicate the distance of the horn from the surface 282 on the underside of the shear block 270; those on the front face of the arcuate wall 226 are also such as to indicate, also in one-eighths of an inch, the length of feed of the wire stock. Thus, if the handle 222 is set against the same number on the wall as is just exposed on the bar 126, the fasteners driven will just penetrate through the work to the anvil when the driving pin reaches the undersurface 282 of the block 270. Fasteners will be driven further if the driving pin is set to penetrate the work. Within reasonable limits, the operator, by observing the reading on the bar 126, can readily adjust the length of fastener to what is appropriate for the thickness of the work presented to the machine. After any such adjustment and after releasing the horn so that the rack 102 rests on the pawls 108, 110, the operator depresses the pedal 80 and a cycle of operations of the machine is initiated. In such cycle, the rods 36 and 146 and cam bar 190 are pulled down and in sequence the leading end of the wire stock is forced (for a second time) against the anvil 294, the jaw 250 returns to its uppermost position, the wire is fed, the shear block 270 swings to sever a fastener from the stock and bring it into alinement with the bore 286 in the jaw, the horn is put under upward pressure to a relatively constant maximum irrespective of the thickness of the work and initial setting of the horn, and the driving pin 312 drives the fastener into the work. The rod 36 and the cam bar 190 then rise to return the parts of the machine to their rest positions, causing the leading end of the wire to be thrust against the anvil 294 to centralize the point as a downward stroke is imparted to the jaw 250; the pressure exerted by the springs 142, 158 on the work support to be relieved. If the operator has released the pedal, the machine comes to rest; if not, it executes another cycle. By this time, while pressure on the horn has been relieved, the shoe bottom will have been moved by the operator over the horn to present a fresh part of the sole to the shear block.

The illustrative machine enables pointed fasteners with their driving points lying on, or substantially on their axes to be cut from wire stock and rapidly and reliably inserted in work pieces without loss of control of the direction of drive of the fasteners such as might result from points offset from the axes of the fasteners. Adjustment of the length of fastener and depth of drive of the head end of the fastener into the work (by control of the depth of penetration of the driving pin) can readily be effected, even while the machine is in operation. Moreover, whenever it becomes necessary to regrind the shearing faces 266, 268 of the jaw and shear block, the jaw and block can be removed from the illustrative machine by undoing the screws 253 and 273 respectively. After grinding, they can be remounted with their bores in alinement without adjustment of their supports; for the bore in the shear block is still parallel to the rocking axis of the lever 274 and remains at the same distance from such axis. Therefore, in order to bring the faces 266, 268 into contact, the jaw merely assumes a slightly lower position on the arm 254, as permitted by the slot 255, before the screws 253 are tightened.

Figure 20:
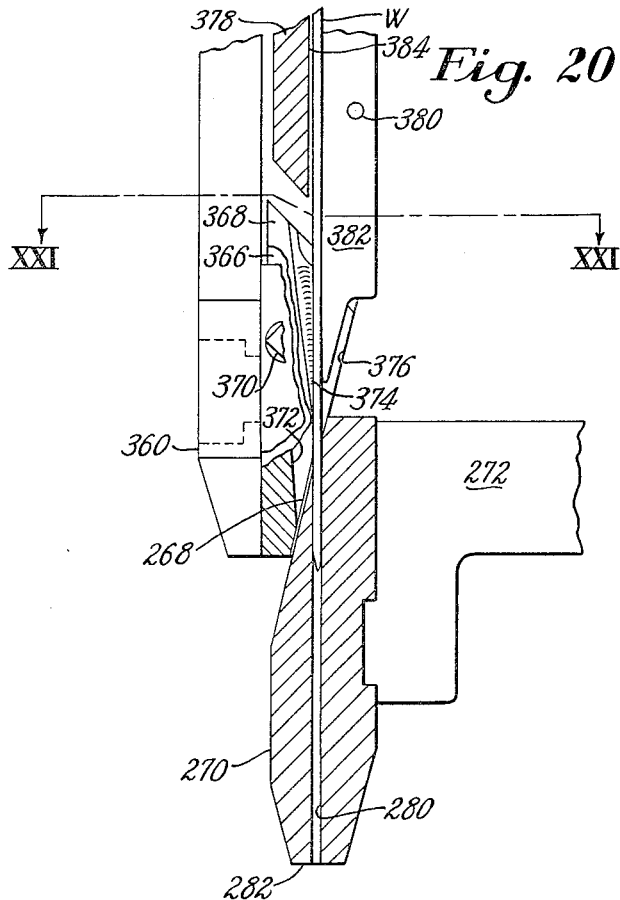
FIG. 20 is a view corresponding to FIG. 15 (but on a larger scale) showing parts of the modified form of the illustrative machine.
Figure 21:
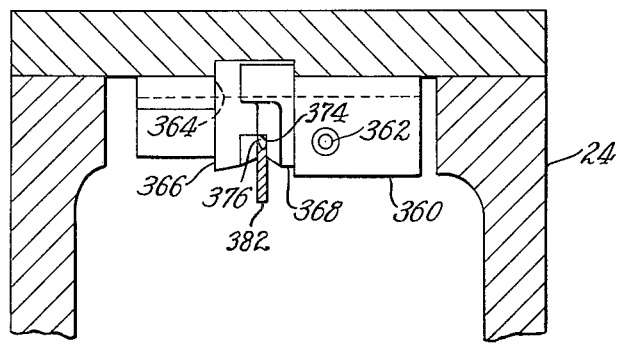
FIG. 21 is a view on the line XXI—XXI of FIG. 20.

In the modification of the illustrative machine mentioned above, a block 360 (FIGS. 20 and 21) is secured to the upper housing 24 and is provided with a bore 362 that serves instead of the bore 286 in the jaws 250 to guide the driving pin 312. The block 360 has a vertical channel 364 in which a knife holder 366 and a knife 368 are clamped by means of a screw 370. The knife 368 is slidable along an inclined face 372 of the holder 366. The holder 366 provides one wall of a slot 376, an inclined floor 374 and an opposite wall of which are provided by the knife 368 which is suitably hardened to enable it to resist undue wear when the wire is sheared against its wall and the point of the wire is centralized by bearing on its floor portion. Before tightening the screw 370 in assembling the knife and knife holder in the machine, for example, after removing the knife for grinding, the knife and holder are allowed to fall into rest positions against the shearing face 268 of the shear block 270. The abutting faces of the knife and knife holder are ground, conically to complement the face 268.

In place of the jaw 250, in the modified form of the illustrative machine there is secured by screws to the arm 254 a blade holder 378, slotted vertically to receive the screws and permit vertical adjustment, on which is secured by screws 380 a blade 382. The blade 382 is secured within a slot in the holder and is alined with a vertical bore 384 in the holder through which the wire W passes. The blade is able to pass within the slot provided by the knife and holder, and when, in the operation of the machine, a downward stroke is imparted to the arm 254 as hereinbefore described, the blade pushes the leading end of the wire W against the floor of the slot provided by the knife and causes the sheared point to assume a position on, or substantially on, the axis of the wire.

Although the invention has been described in its preferred forms with a certain degree of particularity, it will be understood that the present disclosure of the preferred form has been made only by way of example, and that numerous changes in the details of construction and the combination and arrangement of parts may be resorted to without departing from the spirit and the scope of the invention as hereinafter claimed.

Having thus described my invention what I claim as new and desire to secure by Letters Patent of the United States is:

1. A fastener-inserting machine comprising means for severing fasteners from wire stock by shearing the wire obliquely of its axis and additional means for operating on the leading end of the stock after a fastener has been severed therefrom to turn the point left by one shearing operation onto, or substantially onto, the axis of the wire before severing the next fastener therefrom.

2. A fastener-inserting machine comprising a work support, fastener-driving means including an abutment surface arranged to be engaged by the work in the operation of the machine while a fastener is being driven into the work, and means for causing relative movement of approach between the work support and abutment surface to take place to clamp the work therebetween for a fastener-inserting operation, said last-mentioned means comprising a lever pivotally mounted on a bearing yieldable against adjustable spring means, and also comprising spring means for causing the lever to rock on said bearing, the arrangement being such that the maximum pressure exerted upon successive pieces of work will be substantially uniform and determined by adjustment of the adjustable spring means.

3. A fastener-inserting machine comprising an abutment surface arranged to be engaged by the work at the locality where a fastener is to be driven, a work support movable towards the abutment surface and arranged to hold the work against the abutment surface while a fastener is being driven, and means for selectively determining the length of fastener to be driven, the last-mentioned means having associated with it a graduated scale which indicates the length of fastener which the machine is set to insert and the work support having associated with it a graduated scale which indicates its distance from the abutment surface, the latter scale thereby indicating the thickness of the work presented to the machine when the work is held against the abutment surface by the work support and the former scale facilitating the operator's consequently setting the machine for a selected length of fastener appropriate to the work thickness.

4. In a machine for forming fasteners out of wire stock and inserting them into a work piece, a work support mounted upon a shaft, said shaft mounted on said machine freely for both up and down and rotational motion, links, one end of which are connected to said shaft, a drive shaft to which said links are connected at their other end, and compressible means connected pivotally to said links at some intermediate point between their ends, said compressible means being adapted to cause said work support to provide upward thrust sufficient to hold the work firmly during a fastener inserting operation when said drive shaft is moved downwardly and to maintain this upward thrust without substantially increasing it when said drive shaft is depressed farther.

5. In a machine for forming fasteners out of wire stock and inserting them into a work piece, a work support mounted upon a shaft, said shaft mounted on said machine freely for both up and down and rotational motion, links, one end of which are connected to said shaft, link springs mounted on one of their ends to the other end of said links, a drive shaft to which said link springs are connected at their other end, and compressible spring means connected pivotally to said links at some intermediate point between their ends, said spring means being adapted to cause said work support to provide upward thrust sufficient to hold the work firmly during a fastener inserting operation when said drive shaft is moved downwardly and to maintain this upward thrust without substantially increasing it when said drive shaft is depressed farther.

6. In a machine for forming fasteners out of wire stock and inserting them into a work piece, a movable jaw, a bore through said jaw through which wire stock is fed, means for severing short lengths of said wire stock at an angle at one end of said bore, a slot in the jaw opening into said bore, an anvil located in said slot, and means for effecting a short movement of said jaw to cause the pointed end of said wire stock left after each severing action to be turned by contact with said anvil substantially onto the central axis of said wire stock.

References Cited by the Examiner
UNITED STATES PATENTS

| | | | |
|---|---|---|---|
| 1,869,188 | 7/32 | Eckman | 74—40 |
| 2,520,521 | 8/50 | Wright et al. | 1—356 X |

GRANVILLE Y. CUSTER, Jr., *Primary Examiner.*